(12) United States Patent
Hung (10) Patent No.: US 10,729,516 B2
(45) Date of Patent: Aug. 4, 2020

(54) REMOVABLE ORTHODONTIC CORRECTION DEVICE

(71) Applicant: Cheng-Hsiang Hung, New Taipei (TW)

(72) Inventor: Cheng-Hsiang Hung, New Taipei (TW)

( * ) Notice: Subject to any disclaimer, the term of this patent is extended or adjusted under 35 U.S.C. 154(b) by 0 days.

(21) Appl. No.: 15/450,040

(22) Filed: Mar. 6, 2017

(65) Prior Publication Data

US 2017/0258554 A1    Sep. 14, 2017

(30) Foreign Application Priority Data

Mar. 9, 2016   (CN) .......................... 2016 1 0132939

(51) Int. Cl.
*A61C 7/08*  (2006.01)
*A61C 7/10*  (2006.01)
*A61C 7/14*  (2006.01)
*A61C 7/20*  (2006.01)

(52) U.S. Cl.
CPC .................. *A61C 7/08* (2013.01); *A61C 7/10* (2013.01); *A61C 7/145* (2013.01); *A61C 7/20* (2013.01)

(58) Field of Classification Search
CPC .................................................. A61C 7/00–36
USPC ....................................................... 433/1–24
See application file for complete search history.

(56) References Cited

U.S. PATENT DOCUMENTS

| 4,592,725 | A  | * | 6/1986  | Goshgarian | A61C 7/282 |
| | | | | | 433/24 |
| 6,033,217 | A  | * | 3/2000  | Shirasuka  | A61C 7/00 |
| | | | | | 433/18 |
| 6,168,430 | B1 | * | 1/2001  | Higgins    | A61C 7/36 |
| | | | | | 433/19 |
| 8,062,031 | B2 | * | 11/2011 | Inman      | A61C 7/10 |
| | | | | | 433/18 |

(Continued)

FOREIGN PATENT DOCUMENTS

| CN | 1476313 A  | 2/2004  |
| CN | 101277658  | 10/2008 |

(Continued)

OTHER PUBLICATIONS

European Patent Office, Search Report, Search Report Application No. 17160158.6, dated Jul. 11, 2017, Europe.

(Continued)

*Primary Examiner* — Matthew M Nelson (57) ABSTRACT

A removable orthodontic correction device includes a first correction unit, a second correction unit, and several elastic members. The first correction unit is configured to be removably worn on the anterior teeth of the maxillary or mandibular dental arch of a patient and has several first connection parts formed thereon. The second correction unit is configured to be removably worn on the posterior teeth of the same maxillary or mandibular dental arch of the patient and has several second connection parts formed thereon. The elastic members couple the first connection parts to the second connection parts. Thus, the elastic force of the elastic (Continued)

members drives the first correction unit to retract toward the second correction unit, to achieve en masse retraction and intrusion of the anterior teeth during space closure in the treatment of dental protrusion.

17 Claims, 9 Drawing Sheets

(56) References Cited

U.S. PATENT DOCUMENTS

| | | | | |
|---|---|---|---|---|
| 8,807,996 | B2* | 8/2014 | Benvegnu' | A61C 7/00 433/10 |
| 2005/0069834 | A1* | 3/2005 | Inman | A61C 7/10 433/18 |
| 2007/0037110 | A1* | 2/2007 | Mailyan | A61C 7/10 433/6 |
| 2010/0279245 | A1* | 11/2010 | Navarro | A61C 7/08 433/6 |
| 2012/0129117 | A1* | 5/2012 | McCance | A61C 7/10 433/7 |
| 2015/0118635 | A1* | 4/2015 | Kwon | A61C 7/145 433/20 |
| 2015/0257856 | A1* | 9/2015 | Martz | A61C 7/14 433/6 |
| 2016/0120624 | A1* | 5/2016 | Yousefian | A61C 7/282 433/17 |

FOREIGN PATENT DOCUMENTS

| | | |
|---|---|---|
| CN | 103054652 B | 5/2015 |
| EP | 0248125 A1 | 12/1987 |
| JP | 2014-513620 A | 6/2014 |
| KR | 10-2004-0085987 | 10/2004 |
| WO | WO 98/51230 | 11/1998 |
| WO | WO 2007/021468 A2 | 2/2007 |

OTHER PUBLICATIONS

Japan Patent Office, Office Action, Patent Application Serial No. 2017-042556, dated May 7, 2018, Japan.
Korea Patent Office, Office Action, Patent Application Serial No. 9-5-2018-034317160, dated May 21, 2018, Korea.
Japan Patent Office, Office Action, Patent Application Serial No. 2017-042556, dated Jan. 28, 2019, Japan.

* cited by examiner

REMOVABLE ORTHODONTIC CORRECTION DEVICE

CROSS REFERENCE TO RELATED APPLICATIONS

The present application claims priority of China Patent Application No. 201610132939.2, filed on Mar. 9, 2016, the entirety of which is incorporated by reference herein.

BACKGROUND OF THE INVENTION

Field of the Invention

The present application relates to an orthodontic correction technology; and in particular to a removable orthodontic correction device.

Description of the Related Art

Misaligned teeth can adversely affect a person's dental aesthetics, functions, and health. The goal of orthodontic correction is to bring the teeth into proper alignment by using appliances which exert mechanical forces to move the teeth to positions or orientations where the dental functions and aesthetics are improved.

Dental protrusion is a common condition requiring orthodontic treatment. Dentoalveolar protrusion of the maxillary or both the maxillary and mandibular (bimaxillary) anterior teeth results in a convex facial profile. The current treatment for maxillary or bimaxillary protrusion is to extract the first or second premolars, thereby creating a space for anterior teeth retraction. The space closure step is a challenge, calling for an effective mechanism to achieve smooth retraction of the anterior teeth. To prevent the excessive inclination of the anterior teeth due to retraction, simultaneous intrusion of the anterior teeth is required.

Figure 1:
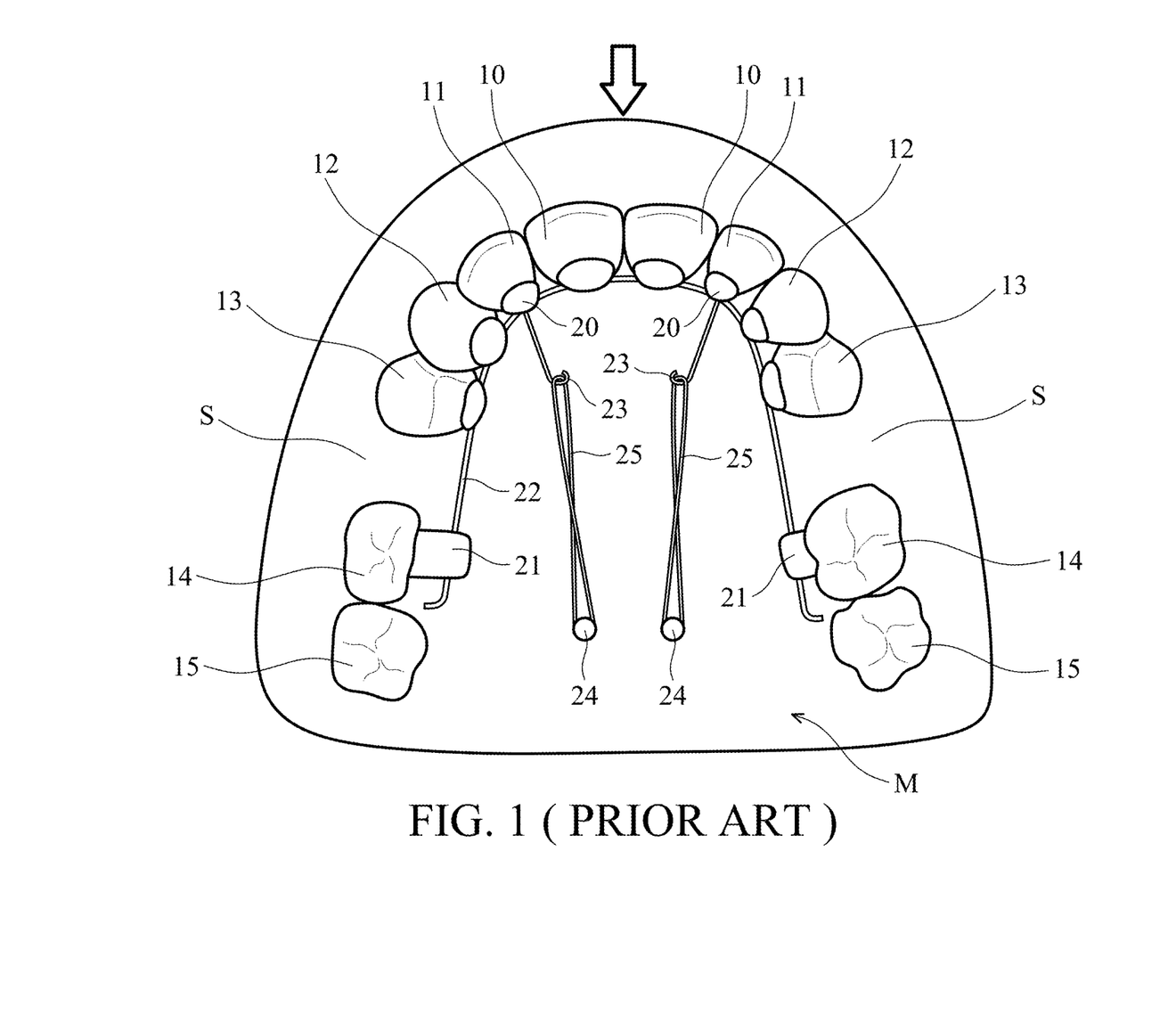
FIG. 1 is a schematic view illustrating a prior art orthodontic correction device being worn on the maxillary dental arch of a patient to achieve space closure in the treatment of maxillary protrusion.

FIG. 1 is a schematic view illustrating a prior art orthodontic correction device being worn on the maxillary dental arch of a patient to achieve space closure in the treatment of maxillary protrusion. As shown in FIG. 1, the orthodontic correction device includes several brackets 20 fixed on the anterior teeth (e.g. the incisors 10, lateral incisors 11, canines 12, and first premolars 13) of the maxillary dental arch, several brackets 21 fixed on the posterior teeth (e.g. the first molars 14) of the maxillary dental arch, a lingual archwire 22 engaging the brackets 20 and 21, several hooks 23 formed as part of the brackets 20, several mini-screw implants 24 fixed on the palate of the maxilla M, and several elastic members 25 coupling the hooks 23 to the mini-screw implants 24.

In this case, the extraction of the second premolars creates the correction spaces S formed between the first premolars 13 and the first molars 14. The mini-screw implants 24 fixed to the palate of the maxilla M act as anchorage, and the elastic members 25 exert elastic traction force on the hooks 23 to achieve retraction and intrusion of the anterior teeth (as the arrow indicates in FIG. 1), thereby closing the correction spaces S (i.e. gaps between the anterior teeth and the posterior teeth).

However, while using the orthodontic correction device described above, the mini-screws implants 24 are implanted in the palate of the maxilla M. This is an invasive procedure which can cause local inflammation, and the presence of the implants can restrict tongue motion and cause discomfort to the patient during space closure. Also, the brackets 20 and 21 are bonded to the teeth, and consequently the lingual archwire 22 and the hooks 23 are also long-term fixtures, which is an inconvenience for the patient when eating or brushing teeth. In addition, debonding of brackets and the removal of adhesive or resin debris from the enamel surface can cause damage to the tooth enamel.

BRIEF SUMMARY OF THE INVENTION

In view of the aforementioned problems, an object of the invention is to provide a patient removable orthodontic correction device which can be used to achieve en masse retraction and intrusion of the anterior teeth after the extraction of premolars in order to correct maxillary or bimaxillary protrusion. Another object of the invention is to achieve retraction of the anterior teeth as a single block and effectively deliver bone remodeling pressure to the region of space closure, which is the interproximal alveolar bone near the space left by the extracted premolar.

An embodiment of the invention provides a removable orthodontic correction device, including a first correction unit, a second correction unit, and several elastic members. The first correction unit is configured to be removably worn on the anterior teeth of the maxillary or mandibular dental arch of a patient, and the first correction unit has several first connection parts formed thereon. The second correction unit is configured to be removably worn on the posterior teeth of the same maxillary or mandibular dental arch of the patient, and the second correction unit has several second connection parts formed thereon. The elastic members couple the first connection parts to the second connection parts. Thus, the elastic force of the elastic members drive the first correction unit to retract toward the second correction unit, so that the anterior teeth can also move toward the posterior teeth, thereby closing gaps between the anterior teeth and the posterior teeth formed by premolar extractions.

In some embodiments, the first connection parts are fixed on a lingual surface of the first correction unit. The second correction unit includes a first transverse part and several mounting parts connected to both ends of the first transverse part. The mounting parts at each end of the first transverse part are joined together and configured to be removably mounted on the posterior teeth. The first transverse part is displaced distally from the lingual surface of the first correction unit, and the first transverse part has a curved shape that matches the curvature of the anterior teeth. The anterior part of the first transverse part is elevated, almost touching the palate, or lowered, almost touching the floor of the mouth to increase stability and retention of the second correction unit. The second connection parts of the second correction unit are fixed on the first transverse part or the mounting parts.

In some embodiments, the second correction unit further includes a second transverse part which is also connected to the mounting parts, but is displaced distally from the first transverse part. The second transverse part has a curved shape, almost touching the palate of the patient, so as to increase stability and retention of the second correction unit.

In some embodiments, the first and second connection parts are separated by a distance horizontally and by a distance vertically, such that the elastic force of the elastic members coupling the first and second connection parts drive the first correction unit to retract toward the second correction unit in the horizontal direction and drive the first correction unit to move in the vertical direction, to achieve retraction and intrusion of the anterior teeth.

In some embodiments, the removable orthodontic correction device further includes a lingual archwire shaped to match the lingual surface of the first correction unit. The lingual archwire engages the lingual surfaces of the first and second correction units, so as to guide the first correction unit to move stably toward the second correction unit In some embodiments, the lingual archwire has several third connection parts formed thereon, and the elastic members couple the second connection parts to the third connection parts, so as to drive the first correction unit to retract toward the second correction unit.

In some embodiments, the lingual archwire has two bent parts formed on both posterior segments thereof, respectively, such that a step is created to adjust for the level difference between the part of the lingual archwire engaging the first correction unit and the part of the lingual archwire engaging the second correction unit, so as to compensate for a natural level difference between the anterior teeth and the posterior teeth.

In some embodiments, several protrusions are formed between the first transverse part and the mounting parts of the second correction unit, and the protrusions each have a tube hole formed thereon. Each of the first connection parts of the first correction unit also has a tube hole formed thereon. The lingual archwire engages the lingual surfaces of the first and second correction units by being threaded through the tube holes of the protrusions and the first connection parts.

In some embodiments, several stoppers are formed on both posterior segments of the lingual archwire, so as to control a distance by which the first correction unit can retract toward the second correction unit.

In some embodiments, the removable orthodontic correction device further includes a labial archwire shaped to match the labial surface of the first correction unit. The labial archwire engages the labial surface of the first correction unit and the buccal surfaces of the second correction units, so as to guide the first correction unit to move stably toward the second correction unit.

In some embodiments, the removable orthodontic correction device further includes a labial elastic member engaging the labial surfaces of the first and second correction units. The elastic force of the labial elastic member drives the first correction unit to move toward the second correction unit and to provide additional torque control.

In some embodiments, the first correction unit has several guiding tracks formed on the labial surface thereof, and the guiding tracks are arranged along a horizontal line. Both ends of the labial elastic member are coupled to the labial connection parts on the second correction unit, and the main body of the labial elastic member engages the guiding tracks, either partly above the guiding tracks, or partly below the guiding tracks.

In some embodiments, the mounting parts of the second correction unit encase at least two of the posterior teeth when they are mounted on the posterior teeth.

In some embodiments, the mounting parts each have a thickened structure formed on an occlusal surface thereof, so as to increase the vertical separation between the second correction unit and the opposing dental arch with no correction unit. In cases of deep overbite where the mandibular incisors may obstruct the distal movement of the maxillary incisors, increasing the vertical dimension facilitates the retraction of the maxillary anterior teeth during space closure.

In some embodiments, the thickened structure includes a metal mesh and a layer of dental restorative material, wherein the metal mesh is disposed on the occlusal surface of the mounting part, and the layer of dental restorative material is formed on the metal mesh.

In some embodiments, the second correction unit further includes a labial transverse part extending from the mounting parts along the maxillary or mandibular buccal vestibule. In such cases, the second connection parts are formed on the labial transverse part, and the first connection parts are fixed on the labial surface of the first correction unit. Moreover, the elastic members couple the first connection parts on the labial surface of the first correction unit to the second connection parts on the labial transverse part of the second correction unit.

In some embodiments, the second correction unit includes a labial transverse part and several mounting parts connected to both ends of the labial transverse part. The labial transverse part extends from the mounting parts along a maxillary or mandibular buccal vestibule. In such cases, the second connection parts are formed on the labial transverse part, and the first connection parts are fixed on a labial surface of the first correction unit. The mounting parts at each end of the labial transverse part are joined together and configured to be removably mounted on the posterior teeth.

In some embodiments, each of the stoppers has a fourth connection part thereon, and the elastic members couple the second connection parts to the fourth connection parts, so as to drive the first correction unit to retract toward the second correction unit.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

In order to illustrate the purposes, features, and advantages of the invention, the preferred embodiments and drawings of the invention are shown in detail as follows.

In the following detailed description, the orientations of "on", "above", "under", "below", "left", "right", "anterior" and "posterior" are used for representing the relationship between the relative positions of each element as illustrated in the drawings, and are not meant to limit the invention.

In addition, the present disclosure may repeat reference numerals and/or letters in the various examples. This repetition is for the purpose of simplicity and clarity and does not in itself dictate a relationship between the various embodiments and/or configurations discussed. Various features may be arbitrarily drawn in different scales for the sake of simplicity and clarity.

Figure 2:
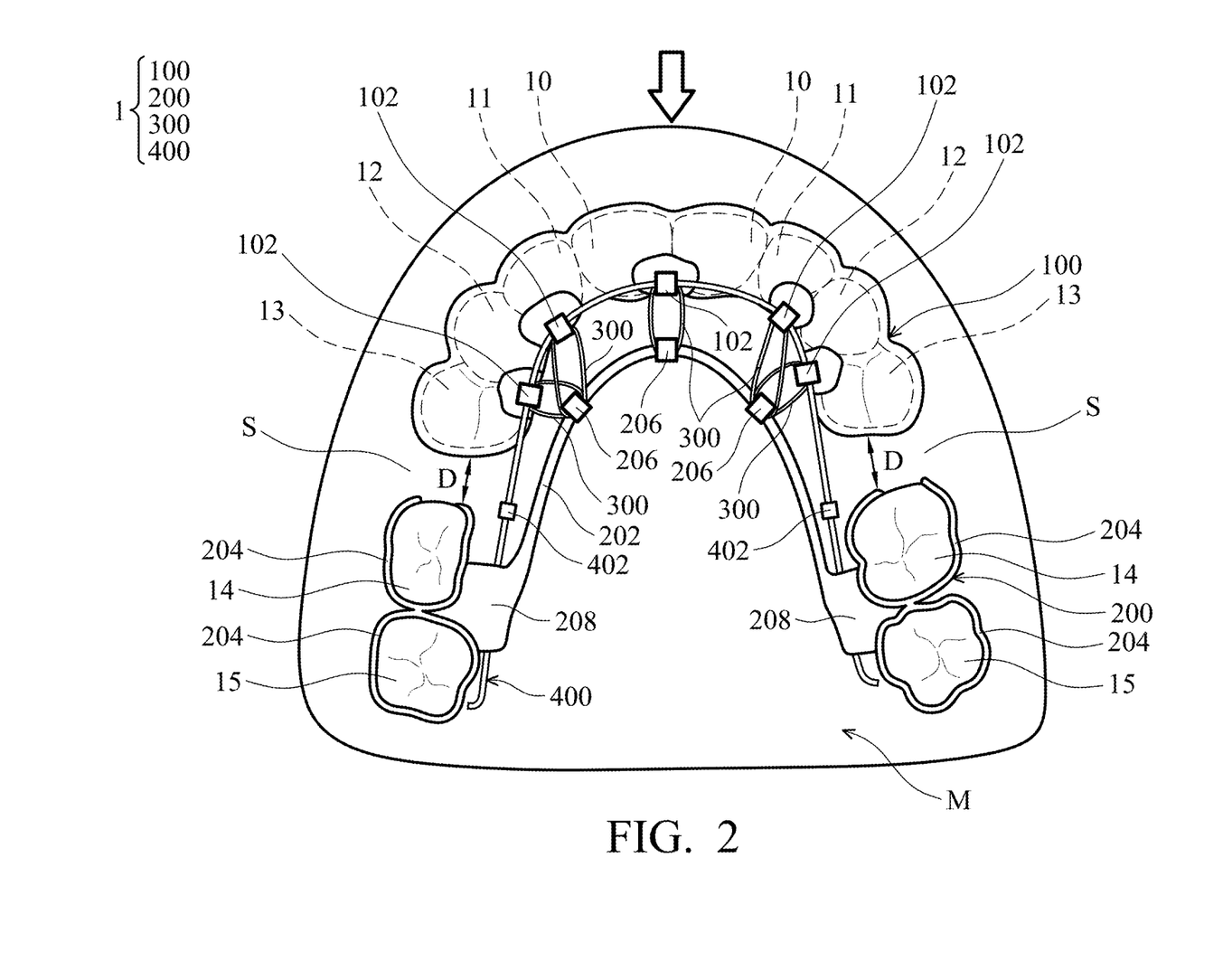
FIG. 2 is a schematic view illustrating a removable orthodontic correction device in accordance with an embodiment of the invention being worn on the maxillary dental arch or mandibular dental arch of a patient.

FIG. 2 is a schematic view illustrating a removable orthodontic correction device 1 in accordance with an embodiment of the invention being worn on the maxillary dental arch or mandibular dental arch of a patient to achieve retraction and intrusion of the anterior teeth for space closure. As shown in FIG. 2, the removable orthodontic correction device 1 includes a first correction unit 100, a second correction unit 200, and several elastic members 300 (e.g. five elastic members 300, but the invention is not limited thereto).

In this embodiment, the first correction unit 100 is a removable retainer configured to be removably worn on the anterior teeth (e.g. the incisors 10, lateral incisors 11, canines 12, and first premolars 13 depicted by dotted lines in FIG. 2) of the maxillary or mandibular dental arch, and the first correction unit 100 has several first connection parts 102 (e.g. five first connection parts 102, but the invention is not limited thereto) fixed on the lingual surface thereof. In this embodiment, each of the first connection parts 102 may have a hook structure, but the invention is not limited thereto. Moreover, the first correction unit 100 may comprise thermoplastic, synthetic resin or other materials suitable for use in oral applications. The first connection parts 102 may comprise stainless steel, Ni—Ti alloy, plastic or ceramic materials, and the first connection parts can be fixed on the first correction unit 100 by adhesion, for example.

In this embodiment, the second correction unit 200 is a metallic frame structure including a first transverse part 202 which is U-shaped, and the anterior part is elevated, almost touching the palate (see also FIG. 3), and several mounting parts 204 which are joined together and connected to both ends of the first transverse part 202 (e.g. four mounting parts 204 (two on each side), but the invention is not limited thereto).

Specifically, the position of the first transverse part 202 corresponds to the lingual surface of the first correction unit 100, and the first transverse part 202 has several protruding second connection parts 206 (e.g. three second connection parts 206, but the invention is not limited thereto) formed thereon. In this embodiment, each of the second connection parts 206 has a hook structure, but the invention is not limited thereto. It should be noted that the U-shaped first transverse part 202 almost touches the palate or the floor of the mouth of the patient (more specifically, if the second correction unit 200 is worn on the maxillary dental arch, the first transverse part 202 almost touches the palate; conversely, if the second correction unit 200 is worn on the mandibular dental arch, the first transverse part 202 almost touches the floor of the mouth), so as to increase stability and retention of the second correction unit 200 and to further reduce the bowing effect known in this art.

The mounting parts 204 are configured to be removably mounted on the posterior teeth (e.g. the first molars 14 and second molars 15) of the maxillary or mandibular dental arch. More specifically, in this embodiment, the mounting parts 204 encase each of the posterior teeth and expose the occlusal surfaces of the posterior teeth, but the invention is not limited thereto. In some embodiments, the second connection part 206 formed on the mounting part 204 also has a hook structure (not shown).

In this embodiment, the elastic members 300 are rubber bands or spring coils made of Ni—Ti alloy material, and the elastic members 300 are configured to couple the first connection parts 102 on the lingual surface of the first correction unit 100 to the second connection parts 206 on the first transverse part 202 of the second correction unit 200. In some embodiments, the elastic members 300 also couple the first connection parts 102 to the second connection parts 206 on the mounting parts 204 of the second correction unit 200.

It should be realized that, when using the removable orthodontic correction device 1 described above, premolar (for example, the second premolars) extractions are performed to create correction spaces S (FIG. 2) between the first premolars 13 and the first molars 14. Then, the first and second correction units 100 and 200 are worn on the anterior teeth (e.g. the incisors 10, lateral incisors 11, canines 12, and first premolars 13) and the posterior teeth (e.g. the first molars 14 and the second molars 15), respectively, of the maxillary or mandibular dental arch, but the invention is not limited thereto (in some embodiments, other teeth (instead of the second premolars) of the maxillary or mandibular dental arch are extracted, and the structure of the first and second correction units 100 and 200 configured to be worn on the anterior teeth and the posterior teeth of the maxillary or mandibular dental arch can be adjusted accordingly). Subsequently, the elastic members 300 are used to couple the first connection parts 102 of the first correction unit 100 to the second connection parts 206 of the second correction unit 200.

Thus, the second correction unit 200 (and the second connection parts 206 thereon) mounted on the first molars 14 and the second molars 15 acts as anchorage, and the elastic force of the elastic members 300 can drive the first correction unit 100 to retract toward the second correction unit 200 (as the arrow indicates in FIG. 2), achieving retraction and intrusion of the anterior teeth, thereby closing the correction spaces S (i.e. gaps between the anterior teeth and the posterior teeth). It should be noted that, in this embodiment, as the patient can conveniently remove the first and second correction units 100 and 200 (no mini-screw implants or brackets bonded to teeth), the present invention has improved upon the prior art orthodontic correction device as shown in FIG. 1 in terms of convenience and patient discomfort.

Figure 3:
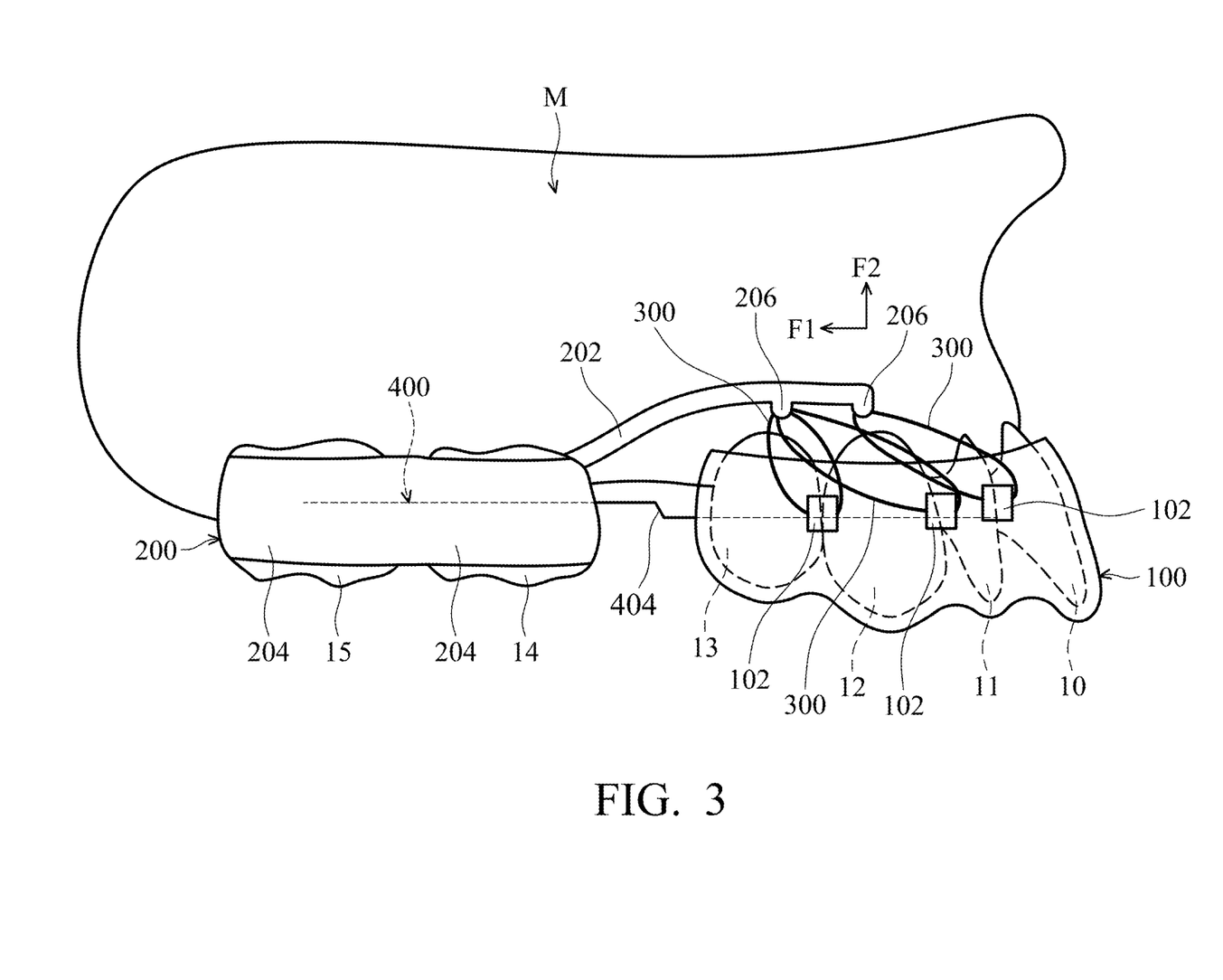
FIG. 3 is a schematic view illustrating how the elastic members in FIG. 2 exert correction forces on the first correction unit.

FIG. 3 is a schematic view illustrating how the elastic members 300 in FIG. 2 exert correction forces on the first correction unit 100. In this embodiment, the first connection parts 102 of the first correction unit 100 and the second connection parts 206 on the first transverse part 202 of the second correction unit 200 are separated by some distance vertically and horizontally (FIG. 3). Accordingly, the elastic members 300 connected between the first connection parts 102 and the second connection parts 206 can not only exert a horizontal correction force F1 on the first correction unit 100, to drive the first correction unit 100 to move in the horizontal direction toward the second correction unit 200 (i.e. retraction of the anterior teeth 10~13 toward the posterior teeth 14~15), but also exert a vertical correction force F2 on the first correction unit 100 simultaneously, to drive the first correction unit 100 to move in the apical direction (i.e. intrusion of the anterior teeth).

It should be noted that, in this embodiment, when the first correction unit 100 is worn on the anterior teeth (e.g. the incisors 10, lateral incisors 11, canines 12, and first premolars 13) of the maxillary or mandibular dental arch, it substantially covers the entire crown of the anterior teeth. More specifically, the first correction unit 100 is designed according to the undercut structure of the anterior teeth, so that the first correction unit 100 can conformably cover the entire crown of the anterior teeth, thereby strengthening the retention of the first correction unit 100 on the anterior teeth. Thus, it can prevent the first correction unit 100 from easily separating from the anterior teeth during orthodontic correction.

Still referring to FIG. 2 and FIG. 3, the removable orthodontic correction device 1 further includes a lingual archwire 400 made of a metallic alloy. The lingual archwire 400 is shaped (bent) to match the lingual surface of the first correction unit, and engages the lingual surfaces of the first and second correction units 100 and 200, so as to guide the first correction unit 100 to move stably toward the second correction unit 200. More specifically, when the elastic members 300 drive the first correction unit 100 to move toward the second correction unit 200, the lingual archwire 400 can provide a supporting force from the lingual side of the first correction unit 100 to counter the correction force of the elastic members 300, thereby ensuring a smooth space closure.

In some embodiments, the lingual archwire 400 further has several third connection parts (not shown) formed thereon, wherein each of the third connection parts may have a hook structure similar to the first connection parts 102. Moreover, the elastic members 300 can also couple the third connection parts to the second connection parts 206 on the first transverse part 202 of the second correction unit 200, to drive the first correction unit 100 to retract toward the second correction unit 200 (as the arrow indicates in FIG. 2).

In this embodiment, the lingual archwire 400 has two bent parts 404 formed on both posterior segments thereof, respectively (only one bent part 404 is depicted in FIG. 3 due to the restricted viewing angle), creating a step to adjust for the level difference between the part of the lingual archwire 400 engaging the first correction unit 100 and the part of the lingual archwire 400 engaging the second correction unit 200, so as to compensate for a natural level difference between the anterior teeth (e.g. the incisors 10, lateral incisors 11, canines 12, and first premolars 13) and the posterior teeth (e.g. first molars 14 and the second molars 15).

As shown in FIG. 2, several protrusions 208 (e.g. two protrusions 208, but the invention is not limited thereto) are respectively formed between the first transverse part 202 and the mounting parts 204 of the second correction unit 200, and each of the protrusions 208 has a tube hole (not shown) formed thereon. In this embodiment, the mounting parts 204, the protrusions 208, and the first transverse part 202 (including the second connection parts 206) of the second correction unit 200 are integrally formed in one piece by dental alloy casting, for example. Moreover, each of the first connection parts 102 of the first correction unit 100 also has a tube hole (not shown) formed thereon. In this embodiment, the lingual archwire 400 engages the lingual surfaces of the first and second correction units 100 and 200 by being threaded through the tube holes on the protrusions 208 and the first connection parts 102. More specifically, while using the removable orthodontic correction device 1 of this embodiment, the lingual archwire 400 and the first and second correction units 100 and 200 are assembled together outside the oral cavity of the patient, and then are worn as a unit on the maxillary or mandibular dental arch within the oral cavity.

In this embodiment, several stoppers 402 (e.g. two stoppers 402) are formed on both posterior segments of the lingual archwire 400, respectively. The stoppers 402 are located near the correction spaces S between the first and second correction units 100 and 200, and are configured to control the distance by which the first correction unit 100 can retract toward the second correction unit 200. For example, the stoppers 402 of the lingual archwire 400 may be positioned so that when the first correction unit 100 moves a certain distance D (FIG. 2) toward the second correction unit 200 and the correction spaces S are closed, the stoppers 402 abut against the adjacent protrusions 208 of the second correction unit 200. Accordingly, the distance by which the first correction unit 100 retracts can be controlled.

In some embodiments, each of the stoppers 402 further has a fourth connection part (not shown) formed thereon, wherein the fourth connection part may have a hook structure similar to the first connection parts 102. Moreover, the elastic members 300 can also couple the fourth connection parts to the second connection parts 206 on the mounting parts 204 of the second correction unit 200, to drive the first correction unit 100 to retract toward the second correction unit 200 (as the arrow indicates in FIG. 2).

Figure 4:
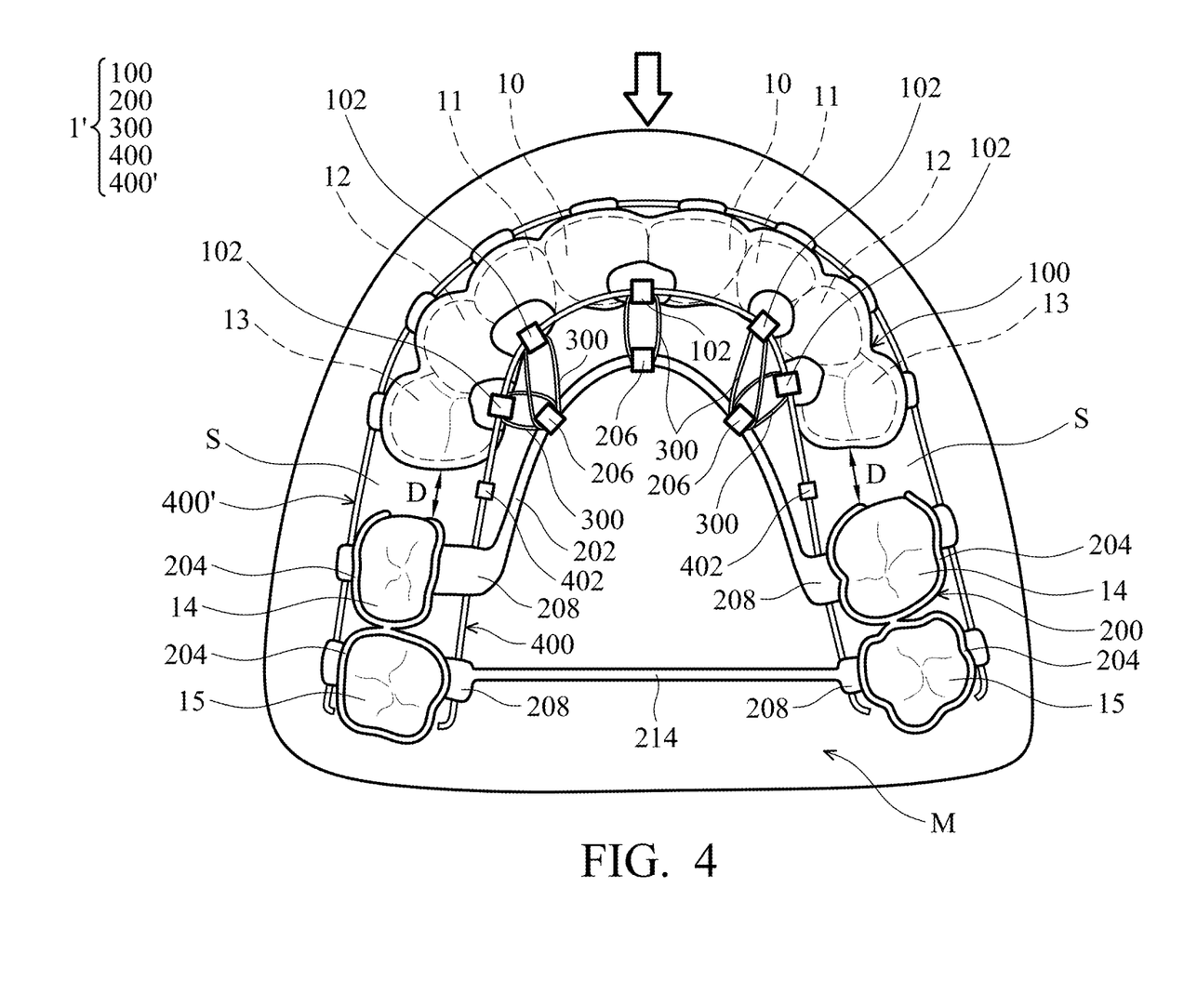
FIG. 4 is a schematic view illustrating a removable orthodontic correction device in accordance with another embodiment of the invention being worn on the maxillary dental arch or mandibular dental arch of a patient.

Next, please refer to FIG. 4, which is a schematic view illustrating a removable orthodontic correction device 1' in accordance with another embodiment of the invention being worn on the maxillary dental arch or mandibular dental arch of a patient (used to correct maxillary or bimaxillary protrusion). The removable orthodontic correction device 1' differs from the removable orthodontic correction device 1 shown in FIG. 2 in that the second correction unit 200 further includes a second transverse part 214. Specifically, the second transverse part 214 is also connected to the mounting parts 204 and displaced distally from the first transverse part 202. Also, the second transverse part 214 almost touches the palate (when the second correction unit 200 is worn on the maxillary dental arch), so as to increase stability and retention of the second correction unit 200. It should be noted that when the second correction unit 200 is worn on the mandibular dental arch, the second correction unit 200 has only a first transverse part 202 and no second transverse part 214 because of the presence of the tongue.

Moreover, the removable orthodontic correction device 1' of this embodiment (FIG. 4) further includes a labial archwire 400' made of a metallic alloy. The labial archwire 400' is shaped (bent) to match the labial surface of the first correction unit and engages the labial surfaces of the first and second correction units 100 and 200 (the method of fixing the labial archwire 400' is similar to the method of fixing the lingual archwire 400 on the lingual surfaces of the first and second correction units 100 and 200 as described above, and thus is not repeated here), so as to guide the first correction unit 100 to move stably toward the second correction unit 200.

Figure 5:
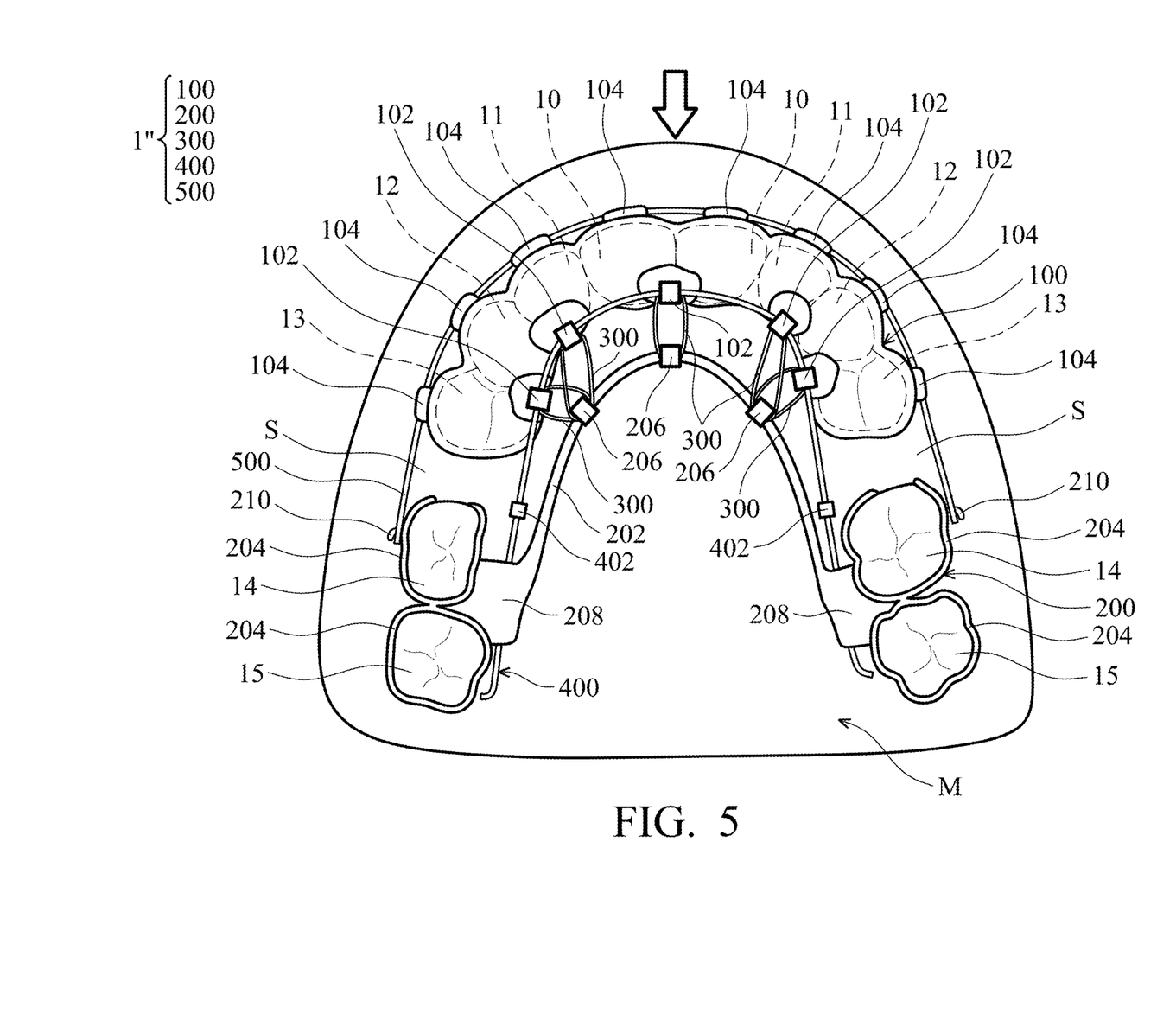
FIG. 5 is a schematic view illustrating a removable orthodontic correction device in accordance with another embodiment of the invention being worn on the maxillary dental arch or mandibular dental arch of a patient.
Figure 6A:
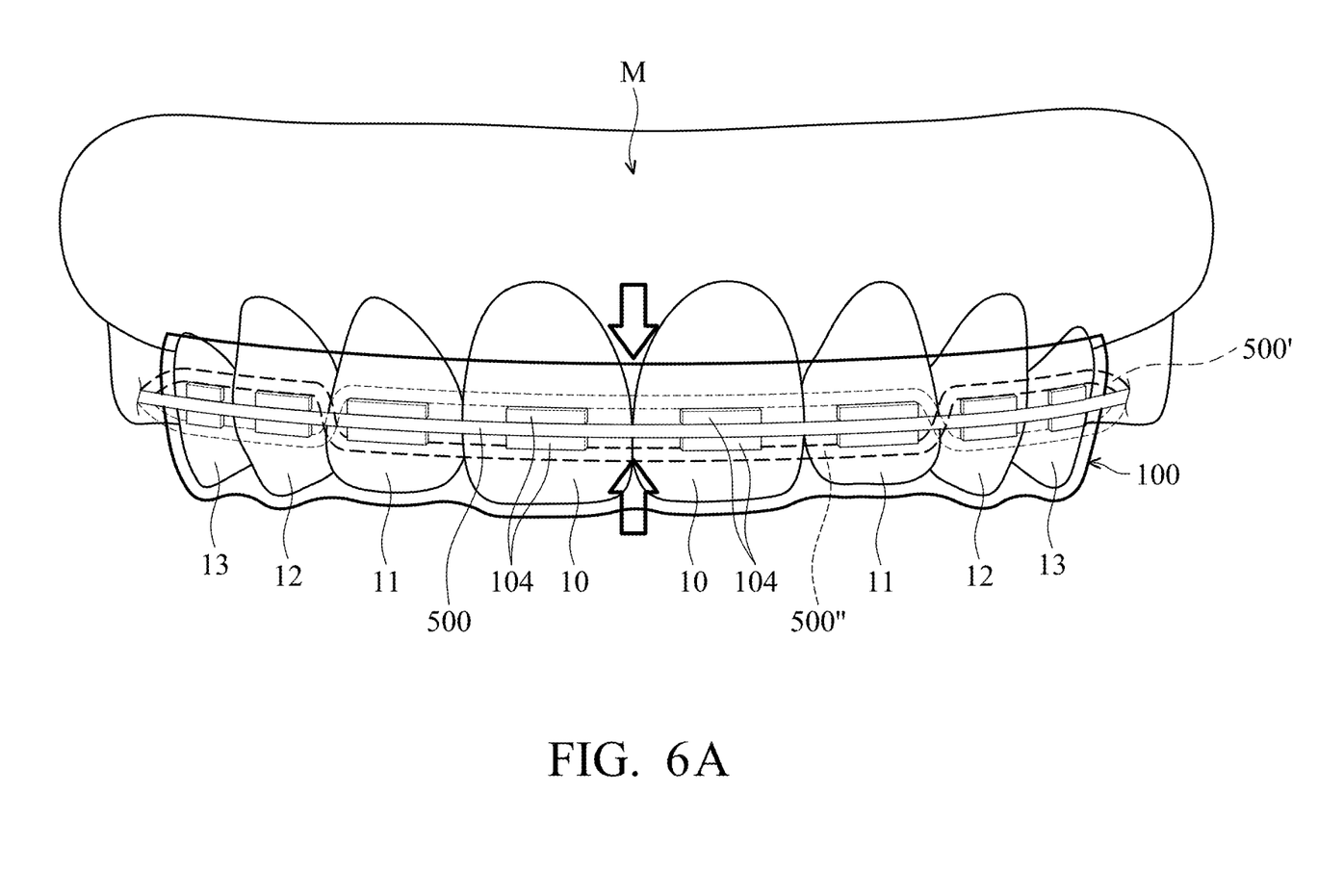
FIG. 6A is a schematic view illustrating the features of the labial surface of the first correction unit in FIG. 5.
Figure 6B:
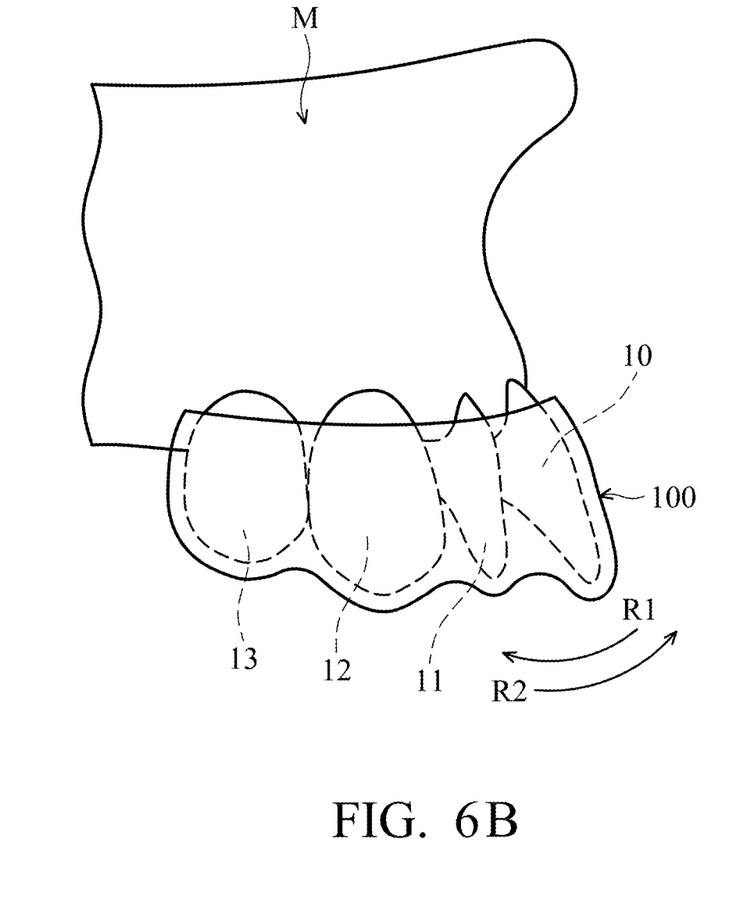
FIG. 6B is a schematic view illustrating how the labial elastic member in FIG. 5 exerts various correction torques on the first correction unit.

Next, please refer to FIGS. 5, 6A, and 6B, wherein FIG. 5 is a schematic view illustrating a removable orthodontic correction device 1" in accordance with another embodiment of the invention being worn on the maxillary dental arch or mandibular dental arch of a patient (used to correct maxillary protrusion or bimaxillary protrusion), FIG. 6A is a schematic view illustrating the features (including various wearing methods of a labial elastic member 500) of the labial surface of the first correction unit 100 in FIG. 5, and FIG. 6B is a schematic view illustrating how the labial elastic member 500 in FIG. 5 exerts various correction torques on the first correction unit 100. The removable orthodontic correction device 1" differs from the removable orthodontic correction device 1 shown in FIG. 2 in that it further includes a labial elastic member 500 made of rubber.

In this embodiment, the labial elastic member 500 is disposed on the labial surfaces of the first and second correction units 100 and 200. More specifically, as shown in FIG. 5 and FIG. 6A, two protruding labial connection parts 210 (FIG. 5) are respectively formed on the labial surfaces of the mounting parts 204 (e.g. the mounting parts 204 encasing the two first molars 14, but the invention is not limited thereto) of the second correction unit 200. In addition, the first correction unit 100 has several guiding tracks 104 formed on the labial surface thereof, wherein the guiding tracks 104 are arranged along a horizontal line as shown in FIG. 6A. Specifically, both ends of the labial elastic member 500 can be coupled to (e.g. by way of hooking into) labial connection parts 210 (in this embodiment, each of the labial connection parts 210 may have a hook structure or a notch structure, but the invention is not limited thereto) on the second correction unit 200, respectively, and the main body of the labial elastic member 500 engages the guiding tracks 104.

With the aforementioned design, the second correction unit 200 (and the labial connection parts 210 thereon) mounted on the first molars 14 and the second molars 15 can be regarded as anchorage, and the elastic force of the labial elastic member 500 can also drive the first correction unit 100 to retract toward the second correction unit 200 (as the arrow indicates in FIG. 5) to close the correction spaces S (i.e. gaps between the anterior teeth and the posterior teeth), thereby achieving efficient correction of maxillary or bimaxillary protrusion.

It should be noted that, as shown in FIG. 6A and FIG. 6B, by various wearing methods of the labial elastic member 500, the elastic force of the labial elastic member 500 can apply additional torque control on the first correction unit 100.

For example, as shown in FIG. 6A, if the main body of the labial elastic member 500 is at least partially disposed on the upper side of the guiding tracks 104 (the labial elastic member in this state is depicted by dotted lines and indicated by reference number 500'), the elastic force of the labial elastic member 500' can not only drive the first correction unit 100 to retract toward the second correction unit 200 (as the arrow indicates in FIG. 5), but also apply downward tilt pressure on the first correction unit 100 (as the down arrow indicates in FIG. 6A), thereby increasing torque control in the direction R1 indicates in FIG. 6B. Conversely, if the main body of the labial elastic member 500 is at least partially disposed on the lower side of the guiding tracks 104 (the labial elastic member in this state is depicted by dotted lines and indicated by reference number 500"), the elastic force of the labial elastic member 500" can not only drive the first correction unit 100 to retract toward the second correction unit 200 (as the arrow indicates in FIG. 5), but also apply upward tilt pressure on the first correction unit 100 (as the up arrow indicates in FIG. 6A), thereby increasing torque control in the direction R2 indicates in FIG. 6B.

Figure 7:
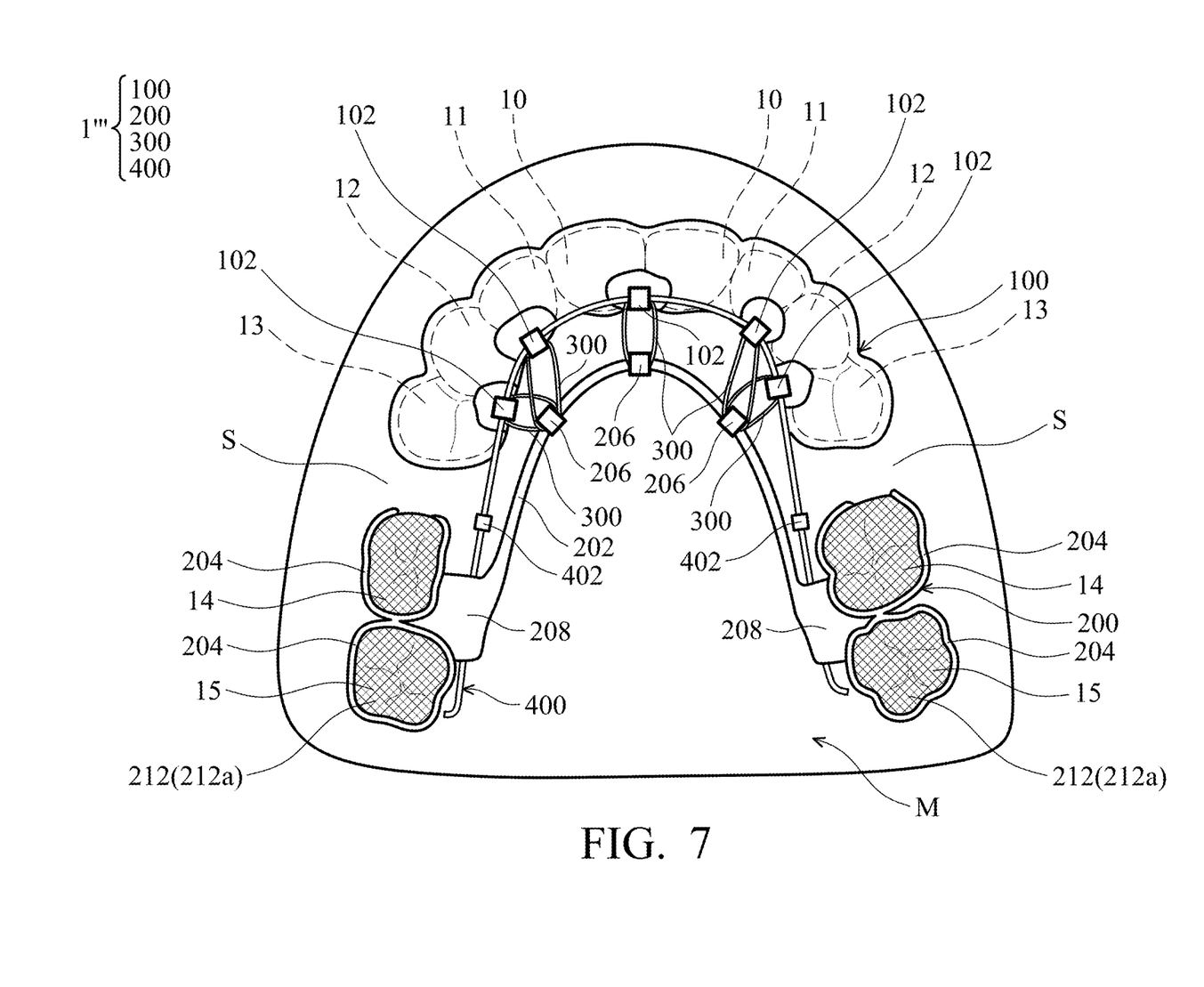
FIG. 7 is a schematic view illustrating a removable orthodontic correction device in accordance with another embodiment of the invention being worn on the maxillary dental arch or mandibular dental arch of a patient.

Next, please refer to FIG. 7, which is a schematic view illustrating a removable orthodontic correction device 1''' in accordance with another embodiment of the invention being worn on the maxillary dental arch or mandibular dental arch of a patient (used to correct maxillary or bimaxillary protrusion). The removable orthodontic correction device 1''' differs from the removable orthodontic correction device 1 shown in FIG. 2 in that the mounting parts 204 of the second correction unit 200 each further have a thickened structure 212 formed on the occlusal surface thereof.

In this embodiment, the thickened structure 212 includes a metal mesh 212a and a layer of dental restorative material (not shown), wherein the metal mesh 212a is disposed on the occlusal surface (FIG. 7) of the mounting part 204, and the layer of dental restorative material is formed on the metal mesh 212a. More specifically, the metal meshes 212a and the mounting parts 204 may be integrally formed in one piece by dental alloy casting, for example, and the layer of dental restorative materials may be applied to the metal meshes 212a by a coating process. In this embodiment, the dental restorative material is a synthetic resin having a hardness less than that of tooth enamel or other dental restorative materials suitable for use in oral applications.

With the design of the thickened structures 212, the vertical separation between the second correction unit 200 and the opposing dental arch (not shown) with no correction unit is increased, thereby preventing the first correction unit 100 from being obstructed by the opposing dental arch in deep overbite situations during retraction.

Figure 8:
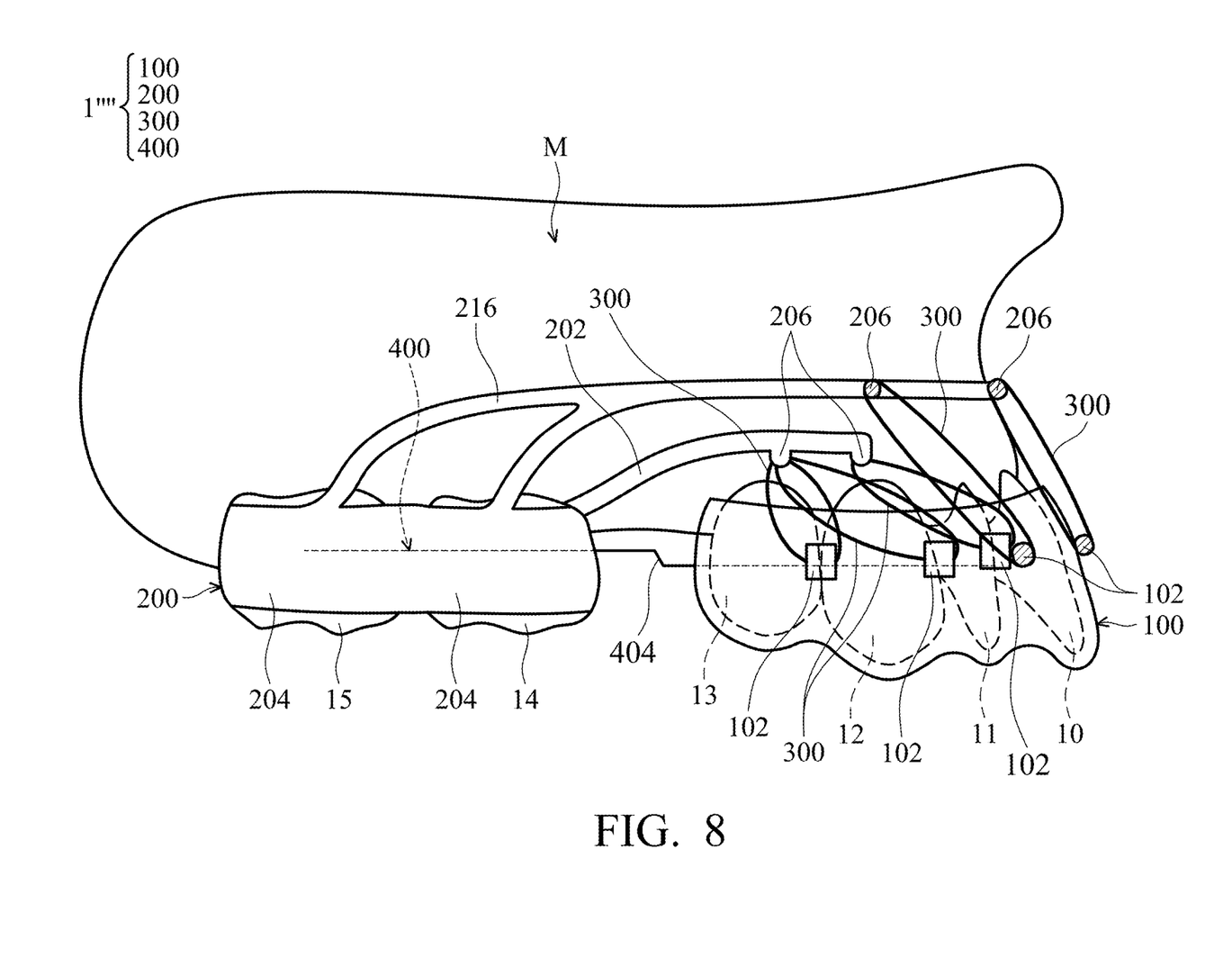
FIG. 8 is a schematic view illustrating a removable orthodontic correction device in accordance with another embodiment of the invention being worn on the maxillary dental arch or mandibular dental arch of a patient.

Next, please refer to FIG. 8, which is a schematic view illustrating a removable orthodontic correction device 1'''' in accordance with another embodiment of the invention being worn on the maxillary dental arch or mandibular dental arch of a patient (used to correct maxillary or bimaxillary protrusion). The removable orthodontic correction device 1'''' differs from the removable orthodontic correction device 1 shown in FIGS. 2 and 3 in that the second correction unit 200 further includes a labial transverse part 216 extending from the mounting parts 204 along the maxillary or mandibular buccal vestibule. As shown in FIG. 8, the position of the labial transverse part 216 corresponds to a position in the maxillary or mandibular buccal vestibule (more specifically, if the second correction unit 200 is worn on the maxillary dental arch, the position of the labial transverse part 216 corresponds to a position in the maxillary buccal vestibule; conversely, if the second correction unit 200 is worn on the mandibular dental arch, the position of the labial transverse part 216 corresponds to a position in the mandibular buccal vestibule). In this embodiment, the labial transverse part 216 further has several second connection parts 206 (the structure thereof is similar to the second connection parts 206 on the first transverse part 202 as described above, and thus is not repeated here) formed thereon, and the labial surface of the first correction unit 100 also has several first connection parts 102 (the structure thereof is similar to the first connection parts 102 on the lingual surface of the first correction unit 100 as described above, and thus is not repeated here) fixed thereon. Moreover, the elastic members 300 also couple the first connection parts 102 on the labial surface of the first correction unit 100 to the second connection parts 206 on the labial transverse part 216 of the second correction unit 200, so as to exert a correction force, similar to the correction force (including a horizontal correction force F1 and a vertical correction force F2) in the embodiment of FIG. 3, on the first correction unit 100, thereby achieving retraction and intrusion for space closure.

In some embodiments, the first transverse part 202 of the second correction unit 200 is omitted, and the second correction unit 200 includes merely the labial transverse part 216 connecting to several mounting parts 204 which are joined together.

As described above, the embodiments of the invention provide various removable orthodontic correction devices which can be used to achieve retraction and intrusion for space closure. Specifically, the removable orthodontic correction devices can achieve en masse intrusion and retraction of the anterior teeth with additional torque control during space closure in the treatment of maxillary or bimaxillary protrusion.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A removable orthodontic correction device, comprising:
    a first correction unit configured to be removably worn on the anterior teeth of a maxillary or mandibular dental arch of a patient, the first correction unit having a plurality of first connection parts formed thereon;
    a second correction unit configured to be removably worn on the posterior teeth of the maxillary or mandibular dental arch of the patient, the second correction unit having a plurality of second connection parts formed thereon; and
    a plurality of elastic members coupling the first connection parts to the second connection parts, wherein the elastic force of the elastic members drive the first correction unit to retract toward the second correction unit and drive the anterior teeth to move toward the posterior teeth, thereby closing gaps between the anterior teeth and the posterior teeth formed by premolar extractions;
    wherein the first connection parts are fixed on a lingual surface of the first correction unit, and the second correction unit includes a first transverse part and a plurality of mounting parts connected to both ends of the first transverse part with the mounting parts at each end joined together and configured to be removably mounted on the posterior teeth, the first transverse part being displaced distally from the lingual surface of the first correction unit, the first transverse part having a curved shape that matches the curvature of the anterior teeth, an anterior part of the first transverse part being elevated, almost touching the palate, or lowered, almost touching the floor of the mouth so as to increase stability and retention of the second correction unit, and the second connection parts of the second correction unit being fixed on and spread out along the first transverse part and not just at the ends of the first transverse part.

2. The removable orthodontic correction device as claimed in claim 1, wherein the second correction unit further includes a second transverse part which is also connected to the mounting parts, but is displaced distally from the first transverse part, and the second transverse part has a curved shape, almost touching the palate of the patient, so as to increase stability and retention of the second correction unit.

3. The removable orthodontic correction device as claimed in claim 1, wherein the first and second connection parts are separated by a distance horizontally and by a distance vertically, such that the elastic force of the elastic members coupling the first and second connection parts drive the first correction unit to retract toward the second correction unit in the horizontal direction and drive the first correction unit to move in the vertical direction.

4. The removable orthodontic correction device as claimed in claim 1, further comprising a lingual archwire shaped to match the lingual surface of the first correction unit, wherein the lingual archwire engages the lingual surfaces of the first and second correction units, so as to guide the first correction unit to move stably toward the second correction unit.

5. The removable orthodontic correction device as claimed in claim 4, wherein the lingual archwire has a plurality of third connection parts formed thereon, and the elastic members couple the second connection parts to the third connection parts, so as to drive the first correction unit to retract toward the second correction unit.

6. The removable orthodontic correction device as claimed in claim 4, wherein the lingual archwire has two bent parts formed on both posterior segments thereof, respectively, such that a step is created to adjust for the level difference between the part of the lingual archwire engaging the first correction unit and the part of the lingual archwire engaging the second correction unit, so as to compensate for the natural level difference between the anterior teeth and the posterior teeth.

7. The removable orthodontic correction device as claimed in claim 4, wherein a plurality of protrusions are respectively formed between the first transverse part and the mounting parts of the second correction unit, the protrusions each having a tube hole formed thereon, and each of the first connection parts of the first correction unit also has a tube hole formed thereon, and the lingual archwire engages the lingual surfaces of the first and second correction units by being threaded through the tube holes of the protrusions and the first connection parts.

8. The removable orthodontic correction device as claimed in claim 4, wherein a plurality of stoppers are formed on both posterior segments of the lingual archwire, so as to control a distance by which the first correction unit can retract toward the second correction unit.

9. The removable orthodontic correction device as claimed in claim 8, wherein each of the stoppers has a fourth connection part thereon, and the elastic members couple the second connection parts to the fourth connection parts, so as to drive the first correction unit to retract toward the second correction unit.

10. The removable orthodontic correction device as claimed in claim 4, further comprising a labial archwire shaped to match the labial surface of the first correction unit, wherein the labial archwire engages the labial surface of the first correction unit and the buccal surfaces of the second correction unit, so as to guide the first correction unit to move stably toward the second correction unit.

11. The removable orthodontic correction device as claimed in claim 4, further comprising a labial elastic member engaging the labial surface of the first correction unit and the buccal surfaces of the second correction unit, wherein the elastic force of the labial elastic member drives the first correction unit to move toward the second correction unit and to provide additional torque control.

12. The removable orthodontic correction device as claimed in claim 11, wherein the first correction unit has a plurality of guiding tracks formed on the labial surface thereof, the guiding tracks being arranged along a horizontal line, and both ends of the labial elastic member are coupled to labial connection parts on the second correction unit, and a main body of the labial elastic member engages the guiding tracks, either partly above the guiding tracks, or partly below the guiding tracks.

13. The removable orthodontic correction device as claimed in claim 1, wherein the mounting parts of the second correction unit encase at least two of the posterior teeth when the mounting parts are mounted on the posterior teeth.

14. The removable orthodontic correction device as claimed in claim 13, wherein a mounting part has a thickened structure formed on an occlusal surface thereof, so as to increase the vertical separation between the second correction unit and the opposing dental arch with no correction unit, thereby facilitating the retraction of the anterior teeth.

15. The removable orthodontic correction device as claimed in claim 14, wherein the thickened structure includes a metal mesh and a layer of dental restorative material with the metal mesh disposed on the occlusal surface of the mounting part and the layer of dental restorative material formed on the metal mesh.

16. The removable orthodontic correction device as claimed in claim 1, wherein the second correction unit further includes a labial transverse part extending from the mounting parts along a maxillary or mandibular buccal vestibule of the patient with a plurality of third connection parts formed on the labial transverse part, a plurality of fourth connection parts fixed on a labial surface of the first correction unit, and the elastic members coupling the fourth connection parts on the labial surface of the first correction unit to the third connection parts on the labial transverse part of the second correction unit.

17. A removable orthodontic correction device, comprising:
- a first correction unit configured to be removably worn on the anterior teeth of a maxillary or mandibular dental arch of a patient, the first correction unit having a plurality of first connection parts formed thereon;
- a second correction unit configured to be removably worn on the posterior teeth of the maxillary or mandibular dental arch of the patient, the second correction unit having a plurality of second connection parts formed thereon; and
- a plurality of elastic members coupling the first connection parts to the second connection parts, wherein the elastic force of the elastic members drive the first correction unit to retract toward the second correction unit and drive the anterior teeth to move toward the posterior teeth, thereby closing gaps between the anterior teeth and the posterior teeth formed by premolar extractions;
- wherein the second correction unit includes a labial transverse part and a plurality of mounting parts connected to both ends of the labial transverse part with the mounting parts at each end joined together and configured to be removably mounted on the posterior teeth, the labial transverse part extending from the mounting parts along a maxillary or mandibular buccal vestibule of the patient, the second connection parts being formed on and spread out along the labial transverse part and not just at the ends of the labial transverse part, and the first connection parts being fixed on a labial surface of the first correction unit.

\* \* \* \* \*